(12) United States Patent
Has et al.

(10) Patent No.: US 12,501,524 B2
(45) Date of Patent: Dec. 16, 2025

(54) DOMESTIC APPLIANCE HAVING A DOOR MONITORING DEVICE

(71) Applicant: BSH Hausgeräte GmbH, Munich (DE)

(72) Inventors: Uwe Has, Unterneukirchen (DE); Barbara Heikel, Traunstein (DE); Arnulf Himmel, Traunreut (DE); Bernhard Koch, Inzell (DE); Manfred Steinbacher, Inzell (DE); Edith Wrehde, Nußdorf (DE)

(73) Assignee: BSH Hausgeräte GmbH, Munich (DE)

( * ) Notice: Subject to any disclaimer, the term of this patent is extended or adjusted under 35 U.S.C. 154(b) by 748 days.

(21) Appl. No.: 17/795,888

(22) PCT Filed: Mar. 3, 2021

(86) PCT No.: PCT/EP2021/055270
§ 371 (c)(1),
(2) Date: Jul. 28, 2022

(87) PCT Pub. No.: WO2021/185576
PCT Pub. Date: Sep. 23, 2021

(65) Prior Publication Data
US 2023/0080195 A1    Mar. 16, 2023

(30) Foreign Application Priority Data

Mar. 19, 2020  (DE) .......................... 102020203519.9

(51) Int. Cl.
*H05B 6/64* (2006.01)
*H01H 13/18* (2006.01)
*H05B 6/46* (2006.01)

(52) U.S. Cl.
CPC ......... *H05B 6/6417* (2013.01); *H01H 13/183* (2013.01); *H05B 6/46* (2013.01)

(58) Field of Classification Search
CPC ... H05B 6/46; H05B 6/48; H05B 6/50; H05B 6/6414; H05B 6/6417; H05B 6/6447;
(Continued)

(56) References Cited

U.S. PATENT DOCUMENTS

| 4,117,294 A | 9/1978 | Appelquist |
| 2009/0039068 A1 | 2/2009 | Boutwell |

(Continued)

FOREIGN PATENT DOCUMENTS

| AU | 595424 B2 * | 3/1990 |
| CN | 109413787 A | 3/2019 |

(Continued)

OTHER PUBLICATIONS

National Search Report DE 10 2020 203 519.9 dated Jan. 15, 2021.
(Continued)

*Primary Examiner* — Hung D Nguyen
(74) *Attorney, Agent, or Firm* — Michael E. Tschupp; Andre Pallapies; Brandon G. Braun

(57) ABSTRACT

A household appliance includes a compartment, a door for closing the compartment, a non-movable part, and a door monitoring apparatus including a contact pair which has two contact parts. One of the two contact parts is arranged on the door and the other one of the two contact parts is arranged on the non-movable part of the household appliance.

20 Claims, 3 Drawing Sheets

(58) Field of Classification Search
CPC . H05B 6/66; H05B 6/666; H05B 6/68; H01H 13/183
See application file for complete search history.

(56) References Cited

U.S. PATENT DOCUMENTS

2014/0197161 A1   7/2014  Dobie
2016/0283822 A1*  9/2016  Imai ................... H05B 6/6485

FOREIGN PATENT DOCUMENTS

| | | |
|---|---|---|
| DE | 3817075 A1 | 11/1989 |
| DE | 102012222152 A1 | 6/2014 |
| EP | 0456846 A1 | 11/1991 |
| ES | 2002189 A6 | 7/1988 |
| WO | 2012062568 A1 | 5/2012 |

OTHER PUBLICATIONS

International Search Report PCT/EP2021/055270 dated Mar. 31, 2021.
National Search Report CN 202180021740.1 dated Mar. 18, 2025.

* cited by examiner

DOMESTIC APPLIANCE HAVING A DOOR MONITORING DEVICE

CROSS-REFERENCES TO RELATED APPLICATIONS

This application is the U.S. National Stage of International Application No. PCT/EP2021/055270, filed Mar. 3, 2021, which designated the United States and has been published as International Publication No. WO 2021/185576 A1 and which claims the priority of German Patent Application, Serial No. 10 2020 203 519.9, filed Mar. 19, 2020, pursuant to 35 U.S.C. 119 (a)-(d).

The contents of International Application No. PCT/EP2021/055270 and German Patent Application, Serial No. 10 2020 203 519.9 are incorporated herein by reference in their entireties as if fully set forth herein.

BACKGROUND OF THE INVENTION

The invention relates to a household appliance having a compartment, which can be closed by means of a door, and at least one door monitoring apparatus. The invention can be applied in particular in an advantageous manner to PEF ("Pulsed Electric Field") cooking appliances and microwave appliances.

With certain household appliances, the operation of which is encumbered with certain risks, it is necessary for reasons of operational safety to reliably detect the opening of the door. Examples of such household appliances include microwave appliances in which the magnetron must not be switched on if the door is open, because otherwise the microwave energy density that occurs in a region in front of the open door can cause burns. In the case of likewise safety-critical PEF cooking appliances, and high voltages lie between the contact plates and also between the contact plates. Touching these contacts or the food or liquid placed between said contacts during operation results in intensive electric shocks. It is irrelevant whether the contact occurs directly or by means of an item of cutlery (for example knife, fork or a wet toothpick).

Doors of such household appliances are frequently monitored by micro pressure switches. These switch the appliance off if the door is in the open state or prevent the activation of specific operating states and function according to the same principle: the closed door mechanically activates the micro pressure switch that is mounted within the household appliance. In the activated state (door closed), the contact of the switch is typically closed. If the door is opened, the switch is returned to its starting position by spring force or the force of gravity and thus re-opened. The switching state of the micro pressure switch is queried by an electrical current via its internal switching contacts. The use of micro pressure switches is quite safe because, for example, in the event of a cable fracture, an open state is detected and a short circuit of the connection wires, which could imply a closed switch, can be reliably prevented by means of constructive measures (for example a suitable wire guide in the appliance).

However, in a disadvantageous manner, the contacts of the micro pressure switch can "stick" over the course of time. This means that the contacts do not open if the door is opened. Such "contact sticking" can have various causes, where appropriate also in combination:

1) An arc is formed as the contacts are opened. This arc is particularly likely to occur if the current for detecting the closed contact is high (for example because the current requirement in the appliance greatly increases owing to a component failure) and/or flows through an inductor which in the short term generates high electrical voltages as a result of self-induction. The arc causes corrosion on the contact surface and (depending upon the polarity of the contact voltage) causes material to be transported between the contacts. The two contacts can become welded together owing to the intensive arcs.
2) If the contact surfaces have become rough during the course of time as a result of corrosion, the unevenness can cause the two contacts to catch with one another. This catching occurs in particular if the two contacts roll off one another during the closing procedure.
3) The force of the spring, which is to separate the contacts in the non-activated state, can reduce over time owing to fatigue, overloading etc., for example. As a result, the contacts do not always separate immediately and reliably.

In order to reduce the danger of micro pressure switches, two micro pressure switches which are activated jointly are often connected in series. It is then irrelevant which of the two switches opens. The safety function is fulfilled in a very reliable manner. However, if one contact sticks, the promised operational safety is once more only present at one, namely the remaining other, switch. This situation can only be monitored by suitable additional measures in the electrical or electronic systems, for example by the individual switches being additionally separately logically connected. However, these additional measures can also fail and it is therefore necessary to monitor them separately.

DE 10 2012 222 152 A1 discloses a household appliance having a door and a door monitoring apparatus for detecting a door status of the door, wherein the door detecting facility has a capacitive sensor and the moving electrode of said capacitive sensor is the door.

EP 0 456 846 A1 discloses an electronic door safety lock for microwave ovens which is based on the principle of influencing coils that are subjected to high frequency, the magnetic circuit of said coils being interrupted by the movement of the door.

DE 38 170 75 A1 discloses a door safety switch for a household appliance, in particular a microwave oven having a cooking compartment that can be closed in a microwave tight manner, having an electrical switching element that can be activated in the closed position of the door by a switching plunger that is arranged on the door of the appliance, wherein the switching element is arranged on a carrier element and the switching element is automatically adjusted by closing the cooking compartment door during assembly.

US 2014197161 A discloses a door switching apparatus for a microwave cooker that deactivates the microwave system without it being necessary for separate "fingers" or pliers to engage with the door surface in the main body of the oven in order to activate a switch. The switch uses stackable switches which are activated by a single switching lever. The switching lever consists preferably of a solid piece of polyethylene with an ultra-high molecular weight (UHMV) in order to maintain the accuracy of the angle dimensions between the surfaces, which contact the door hinge arm, and the switch arm.

BRIEF SUMMARY OF THE INVENTION

It is the object of the present invention to overcome at least in part the disadvantages of the prior art and in particular to provide a possibility that can be implemented in a simple and cost-effective manner for monitoring a door in a particularly reliable manner.

This object is achieved in accordance with the features of the independent claims. Advantageous embodiments are the subject matter of the dependent claims, the description and the drawings.

The object is achieved by a household appliance having a compartment, which can be closed by means of a door, and at least one door monitoring apparatus with at least one contact pair that comprising comprises two contact parts of which one of the contact parts is arranged on the door and the other contact part is arranged on a non-movable part of the household appliance.

As a result, the advantage is realized that a self-securing door contact monitoring for household appliances is provided which, even in the case of the contact parts of the contact pair sticking, reliably detects an open state of the door and/or it is reliably rendered possible, even in the case of the contact parts sticking, to switch off or de-activate the household appliance or components thereof in an operationally safe manner. This household appliance consequently uses a door monitoring apparatus or "door safety lock" which uses the mechanical connection between the mutually moving contact parts as a circuit breaker.

For this purpose, the two contact parts of the at least one contact pair do not represent in particular components of one constructive unit (for example of a switch), but rather they are separate parts. The two contact parts of a contact pair only contact one another if the door is closed and then form an electrical connection.

In this case, the following applies: a) If a previously opened door is closed, the two contact parts of the contact pair contact one another in a proper manner and the closing of the door is correctly detected.

b) If the contact parts do not contact one another when the door is in the closed state—for example in the event of a malfunction—this could be bothersome for a user, since the user cannot operate the household appliance, but it is not relevant for safety in terms of monitoring the door. In such a case, the user can call customer services, for example.

c) If a previously closed door is opened, the two contacts separate from one another in a proper manner or in the normal case and the opening of the door is correctly detected.

d) If the two contact parts have become greatly stuck together to such an extent that they do not separate from one another as the door is opened, they prevent the door from being opened. The safety of the appliance consequently remains preserved. The user notices that the door cannot be opened and can switch off the appliance via the control panel of the appliance and/or call customer services.

e) If a user opens a door, which initially cannot be opened owing to sticking contacts, using force and/or with the aid of tools (for example using a cooking spoon as a lever to open the door), the contact parts are torn away from one another and consequently separated, and the switching function is re-instated. In this case, it is irrelevant as far as safety-relevant considerations are concerned if the appliance is thereafter defective since its safety remains preserved.

Consequently, it is always possible to reliably detect that a door is being opened even in the case of sticking contact parts and any lack of contact of the contact parts when the door is in the closed state does not result in a safety-critical state.

The contact part that is arranged on the non-movable part of the household appliance can also be referred to below as a "non-movably arranged" contact part, the contact part that is arranged on the door also as a "door contact part".

The compartment that can be closed by means of the door can be referred to as a compartment for treating food that is to be treated, such as food that is to be cooked, and also as a cooking compartment, oven compartment etc.

In one development, the at least one door monitoring apparatus is connected to a circuit ("evaluation circuit"), wherein the evaluation circuit is configured so as to monitor the contact state of the two contact parts of the at least one contact pair and in a fundamentally known manner to prevent an operation at least of a safety-critical appliance component (for example of a magnetron or of a PEF signal generator) if the at least one contact pair of the at least one door monitoring apparatus is separated from one another. This can be implemented in one development in such a manner that so as to determine the contact state in a fundamentally known manner an electrical current that flows through the contact parts of a contact pair is queried. As a result, the advantage is realized that it is not necessary to guide a typically greater operating current for an appliance component via the at least one contact pair, which requires a particularly high level of operational safety and avoids wear on the contact parts, for example as a result of arcs. However, in another development, the at least one contact pair can also be installed directly in a current circuit so as to supply energy to at least one—for example safety-critical— appliance component. In one variant, the door monitoring apparatus can have only the at least one contact pair and where appropriate one or multiple electrical lines. If the contact parts are separated, the current circuit of the safety-critical appliance component is also interrupted.

If multiple contact pairs are provided (in one or multiple door monitoring apparatuses), operational safety is still further increased. For this purpose, in particular at least two contact pairs can be electrically connected in series. In general, multiple door monitoring apparatuses that each have one or more contact pairs can be provided, as a result of which redundancy is increased in an advantageous manner. In a particularly advantageous manner, the contact pairs can be arranged in different regions of the door in order, for example, to be able to detect in a particularly reliable manner that the door has been levered open at only one corner of the door or to detect an open state (open or closed) of a warped or loose door. If multiple door monitoring apparatuses are provided, these can be connected separately to an evaluation circuit and/or fundamentally arbitrarily connected or interconnected to one another, for example, electrically in series.

In one embodiment, the door monitoring apparatus has precisely one contact pair. This renders possible a particularly simple and cost-effective embodiment.

In one embodiment, each of the two contact parts of a contact pair is connected to at least one electrical line, for example, so as to guide a current (of the measuring current or operating current), for example, to an evaluation circuit of the household appliance, wherein the at least one electrical line of the door contact part is routed through the door. This electrical line can be designed as a dedicated flexible line (for example a cable) or can be formed by metal parts of the door itself, wherein in the latter case the door hinge can provide the electric transfer to the remaining household appliance.

In one embodiment, at least the non-movable contact part has multiple (for example two) contact surfaces that are electrically separated from one another and the electrical lines are connected to the multiple contact surfaces. The door contact part is thus designed in such a manner that when the door is in the closed state at least two of these contact surfaces of the non-movable contact part are electrically connected. The advantage is consequently realized that the door monitoring apparatus can be electrically connected exclusively via the non-movable contact part, for example to an evaluation circuit. As a result, it is in turn advantageously possible to avoid current flowing through the door to the door contact part that is located therein. Current flowing through the door can namely have the following disadvantages:

If the current is guided directly through a door hinge, this can result in contact being unreliably detected owing to a possibly fluctuating electrical resistance of the door hinge, in particular if the door hinge is mechanically worn out. However, the operational safety of the system also remains preserved because, in the event of an erroneous non-detection of the closed door, the appliance does not function—and this state is safe.

If the current is guided into the door by means of a dedicated flexible electrical line, such as a cable etc., the advantage is realized that said dedicated flexible electrical line does not fracture as a result of the frequent mechanical bending of the line as the door is opened and closed.

A further advantage is that, if an electric consumer (for example a control panel) that is provided in the door is to be supplied with energy, it is possible via a dedicated line in the region of the door hinge to avoid an unfavorable current flow to the door contact part owing to a lack of space, for example.

In one development, the door contact part has corresponding mating contact surfaces that are electrically connected to one another so as to contact the contact surfaces of the non-movable contact part. In one development, the door contact part has an electrically conductive part, for example a metal part, and the surface of said electrically conductive part has the mating contact surfaces. This can be implemented in a particularly simple and cost-effective manner.

In one embodiment, the door monitoring apparatus has two contact pairs and the door contact parts of said contact pairs are electrically connected to one another. In this case, the two door contact pairs are electrically connected in series with respect to the current that is flowing through them. This embodiment renders it possible to further increase operational safety. It is also possible in this case for the door monitoring apparatus to be electrically connected, for example to an evaluation circuit, exclusively via the non-movable contact parts. As a result, in turn, it is also possible in this case to advantageously avoid current flowing through the door to the contact parts that are located in said door.

In one embodiment, the non-movable part of the household appliance is a door flange. Thus, the advantage is achieved that the non-movable contact parts that are arranged therein can be designed and mounted in a particularly simple manner. In the case of a pivotable door, in an advantageous development for an advantageously reliable release of the contact of the contact pairs, even if the door is only slightly open at an angle, and an advantageous diversity of their design, the contact part(s) that is/are located in the door and consequently the contact pair(s) are located on a side of the door, which lie opposite a door hinge, in the case of a horizontally pivotable door having a door hinge(s) lying at the bottom, for example, on a upper edge of the door when the door is in the closed state.

In general, the door can, however, also be a laterally displaceable door or a door which can also open in a different manner.

In one embodiment, the contact parts of a contact pair are designed as plug-in elements of a plug connection, said plug-in elements being formed in a complementary manner, or the contact pair forms a plug-in connection. This renders possible a still more reliable contact of the contact parts when the door is in the closed state than in the case of the embodiment in which they are designed as planar contact surfaces. This is advantageous, for example, if the door or the frame has become warped or the door has become offset with respect to the frame.

In one embodiment, at least one of the contact parts at least of one contact pair that makes contact when the door is in the closed state has an annular groove. This advantageously represents a particularly cost-effective, robust and reliable possibility for contacting the contact parts of a contact pair.

In one embodiment, at least one of the contact parts has a predetermined breaking point. As a result, it is advantageously possible, if the contact pair can no longer be opened in the proper manner and the user therefore opens the door with force, for this contact part to become damaged in a defined manner (for example break) and thus, for example, for its electrical connection to the evaluation circuit or the safety-relevant appliance components to be interrupted.

The contact pairs can be used so as to supply consumers that are present in the door (for example control elements, displays etc.) with electrical energy. For example, the consumers can be connected to at least one electrical line that is connected to a door contact pair and supplied with energy via the current that is flowing in said electrical line. In one development, if the door is opened, the current supply to the consumer is interrupted.

By suitably connecting multiple contact parts together or by suitably designed individual contact surfaces of a non-movable contact part, it is fundamentally possible to protect any number of poles. It is thus possible to provide a two-pole circuit breaker for simple power supply appliances and a three-pole or four-pole circuit breaker for three-phase appliances. This applies in particular if the contact pair(s) is/are installed directly into a current circuit for these appliance components.

Therefore in one development, the contact parts or contact pairs are single-pole or single-pole protected contact parts or contact pairs. In one development, the contact parts or contact pairs are multi-pole or multi-pole protected contact parts or contact pairs.

In one embodiment, the household appliance is a PEF ("Pulsed Electric Field") cooking appliance. However, the household appliance can also be a microwave appliance, for example an independent microwave appliance or a microwave/oven combination. However, in general, any arbitrary household appliance that is equipped with a door can be equipped with the above-described door monitoring apparatus. It is thus possible to also equip service flaps etc. with such a door monitoring apparatus.

BRIEF DESCRIPTION OF THE DRAWINGS

The above-described characteristics, features and advantages of this invention and the manner in which these are realized become clearer and more explicitly understandable in conjunction with the following schematic description of an exemplary embodiment that is further explained in conjunction with the drawings.

DETAILED DESCRIPTION OF EXEMPLARY EMBODIMENTS OF THE PRESENT INVENTION

Figure 1:
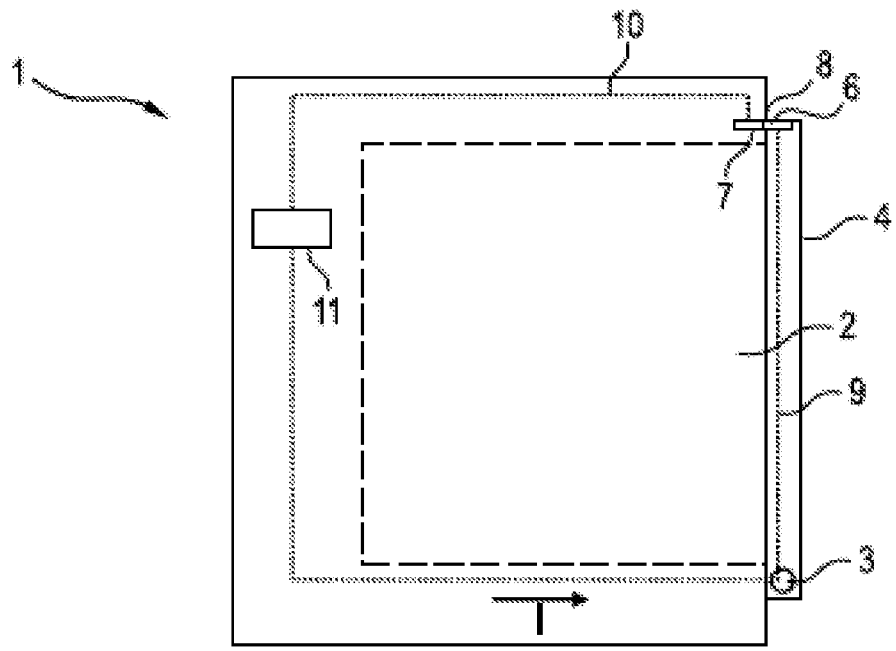
FIG. 1 shows as a sectional illustration in a side view a simplified sketch of a household appliance having a compartment, which can be closed by means of a door, and a door monitoring apparatus in accordance with a first exemplary embodiment with the door in the closed state.

FIG. 1 illustrates as a sectional illustration in a side view a simplified sketch of a household appliance 1, for example of a PEF cooking appliance or of a microwave appliance, having a treatment compartment ("compartment" 2) for food that is to be cooked and said treatment compartment can be closed by means of a door 4 that can pivot about a door hinge 3. The household appliance 1 has moreover a door monitoring apparatus having a contact pair 6, 7, comprising a first ("door") contact part 6, which is arranged on the door 4, and a second ("non-movable") contact part 7, which is arranged on a non-movable part of the household appliance 1 in the region of a flange 8.

The two contact parts 6, 7 are each connected to an electrical line 9 or 10, wherein the electrical line 9 of the door contact part 6 is routed through the door 4 and further in the region of the door hinge 3 into the body of the household appliance 1. The two electrical lines 9, 10 are connected to an evaluation circuit 11 of the door monitoring apparatus.

Figure 2:
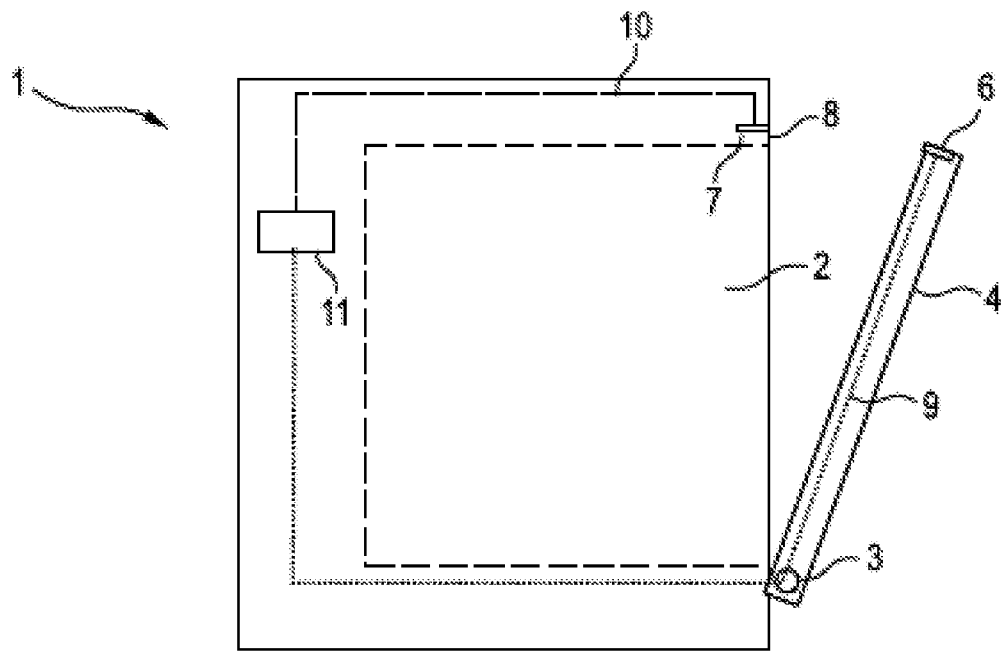
FIG. 2 shows as a sectional view in a side view the household appliance shown in FIG. 1 with the door in an open state.

The evaluation circuit 11 is configured so as to detect whether or not the two contact parts 6, 7 are connected to one another. For this purpose, it is possible to apply a voltage via the electrical lines 9, 10 and detect an associated current I: if the current I is flowing through, it is possible to conclude from this that the two contact parts 6, 7 are connected to one another, if the current I is not flowing through, it is possible to conclude from this that the two contact parts 6, 7—as illustrated in FIG. 2—are separated from one another. Based on the detection of the contact state of the two contact parts 6, 7, the household appliance 1 can switch off or allow the switching-off of safety-critical components of the household appliance 1, such as a magnetron, a PEF pulse generator etc., for example by means of the evaluation circuit 11 or a control facility (not illustrated) that is connected thereto.

The door monitoring apparatus therefore comprises in this case the two contact parts 6 and 7, the evaluation circuit 11 and the associated connection lines 9 and 10.

FIG. 2 illustrates the household appliance 1 with the door 4 in the open state, in which the two contact parts 6, 7 are separated from one another. In this case, current I is not flowing through the contact parts 6, 7 and consequently also not flowing through the electrical lines 9, 10.

The household appliance 1 can be reliably operated by way of example under the flowing scenarios:

a) If the previously opened door 4 is closed, the two contact parts 6, 7 contact one another in the proper state and the closed state of the door 4 can be correctly detected by means of the evaluation circuit 11.

b) If the contact parts 6, 7 do not contact one another when the door 4 is in the closed state—for example in the event of a malfunction—although it is incorrectly detected by means of the evaluation circuit 11 that the door is in the open state, it is not however relevant for safety in terms of monitoring the door 4. In such a case, the user can call customer services, for example.

c) If the previously closed door 4 is opened, the two contact parts 6, 7 always separate from one another and the open state of the door is correctly detected.

d) If the two contact parts have become so greatly stuck together (for example are welded to one another) that, when an attempt is made to open the door 4, they do not separate from one another, they prevent the door 4 from being opened. The safety of the household appliance 1 consequently remains preserved. The user notices that the door 4 cannot be opened and can then, for example, switch off the household appliance 1 and/or call customer services.

e) If a user opens the door 4, which initially cannot be opened owing to sticking contacts 6, 7, by using force and/or with the aid of tools (for example using a cooking spoon as a lever to open the door), the contact parts 6, 7 are torn away from one another and consequently separated, and the switching function is reinstated. In this case, it is irrelevant as far as safety considerations are concerned if the household appliance 1 is thereafter defective since its safety remains preserved. If at least one of the contact parts 6, 7 is designed with a predetermined breaking point, current I no longer flows through even if the door 4 is subsequently closed.

Figure 3:
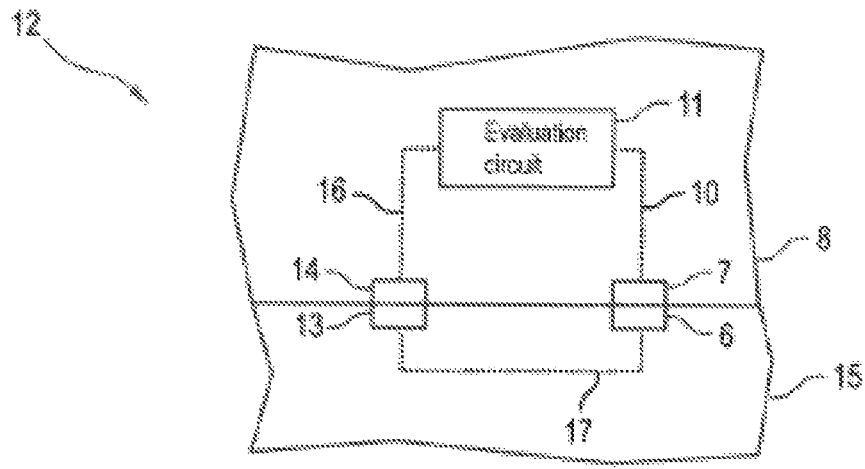
FIG. 3 shows in a front view a section of a household appliance in the region of a door monitoring apparatus in accordance with a second exemplary embodiment with the door in the closed state.

FIG. 3 illustrates in a front view a section of a household appliance 12 with the door 15 in the closed state. The household appliance 12 is designed in a similar manner to the household appliance 1 but has two contact pairs 6, 7 and 13, 14. The contact pair 6, 7 is designed as in the household appliance 1, wherein its non-movable contact part 7 is likewise connected to the evaluation circuit 11 via the electrical line 10. The second contact pair 13, 14 has in a similar manner a "third" door contact part 13 and a "fourth" non-movable contact part 14 that is arranged in the region of the flange 8. In a similar manner to the first contact pair 6, 7, the door contact part 14 is connected to the evaluation circuit 11 via an electrical line 16. The first contact part 6 and the third contact part 13 are electrically connected to one another, by way of example via metal components of the door 15, or, as illustrated, via a dedicated electrical line 17. If the door is in the closed state, the evaluation circuit 11 detects that a current I is flowing through both contact pairs 6, 7 and 13, 14 (connected electrically in series). If even only one of the contact pairs 6, 7 or 13, 14 is open, current I does not flow through. This exemplary embodiment provides the advantage that the operational safety is further increased: if the contact pairs 6, 7 and 13, 14 are located, for example, at different corners of the door 15, then it is possible to take into consideration the case that a user uses force to bend the door open the door at one corner and then the associated contact parts 6, 7 or 13, 14 are separated from one another at least at that site. The door monitoring apparatus has still further advantages in comparison to the door monitoring apparatus shown in FIG. 1 and FIG. 2.

The evaluation circuit 11 is exclusive to the non-movable contact parts 7, 14, so that it is possible to forego an electrical line 9 through the door 15 or through metal components of the door 15. In turn, such a current flow only in the household appliance 1 outside the door 15 provides inter alia the following advantages:

It is avoided that the current 1 is guided directly through the door hinge 3 with its possibly fluctuating electrical resistance, as a result of which in turn it is avoided that contact is incorrectly detected, in particular in the case of a mechanically worn out door hinge 3.

A further advantage is that, if an electric consumer (for example a control panel, not illustrated) provided in the door 15 is to be supplied with energy, it is possible via the door hinge 3 or via a line 9 in the region of the door hinge 3 to avoid an unfavorable current flow to the door contact parts 6 and 13 owing for example to a lack of space. It is also possible to prevent the electrical line 9 fracturing as a result of frequent mechanical loadings as the door 15 is opened and closed.

The door monitoring apparatus comprises in this case the contact parts 6, 7, 13 and 14, the evaluation circuit 11 and the lines 10, 16 and 17.

Figure 4:
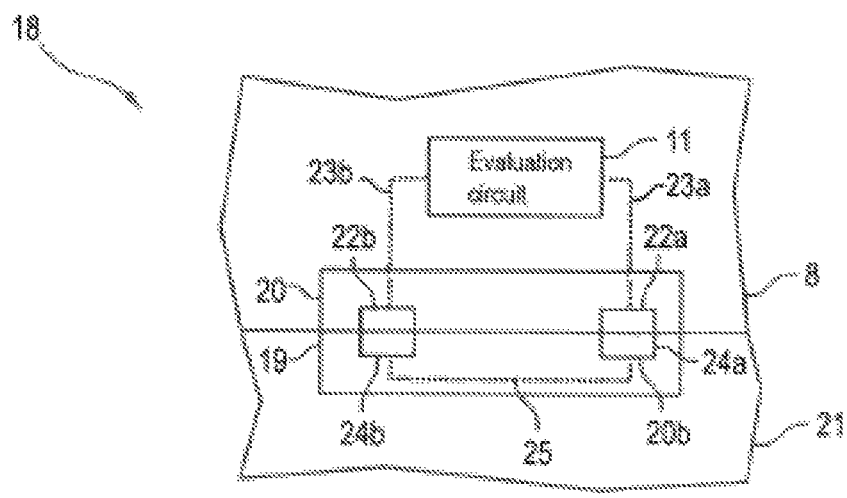
FIG. 4 shows in a front view a section of a household appliance in the region of a door monitoring apparatus in accordance with a third exemplary embodiment with the door in the closed state.

FIG. 4 illustrates in a front view a section of a household appliance 18 with the door 21 in the closed state. The door monitoring apparatus has a contact pair 19, 20 having a first door contact part 19 and a non-movable contact part 20 that is arranged in the region of the flange 8.

In contrast to the household appliance 1, the non-movable contact part 20 has multiple (in this case: two) contact surfaces 22a, 22b that are electrically separated from one another and electrical lines 10 or 16 that lead to the evaluation facility 11 are connected to said contact surfaces.

When the door 21 is in the closed state, the door contact part 19 acts as an electrical (short circuit) bridge between the two contact surfaces 22a, 22b, with the result that a current I can flow via the door contact part 19 between the contact surfaces 22a, 22b. As a consequence, it is possible, even when using only one contact pair 19, 20, to realize the same advantages as is the case with the household appliance 12.

The function as an electrical bridge can be implemented by way of example so that mating contact surfaces 24a, 24b of the door contact part 20, which can make contact with the contact surfaces 22a, 22b, are surface regions of an electrically conductive, for example metal, component, for example metal piece. Alternatively, the mating contact surfaces 24a, 24b can be electrically separated from one another, as illustrated, and can be connected to one another via an electrical line 25.

The door monitoring apparatus therefore comprises in this case the contact parts 19 and 20, the evaluation circuit 11 and the connection lines 10 and 16.

Figure 5:
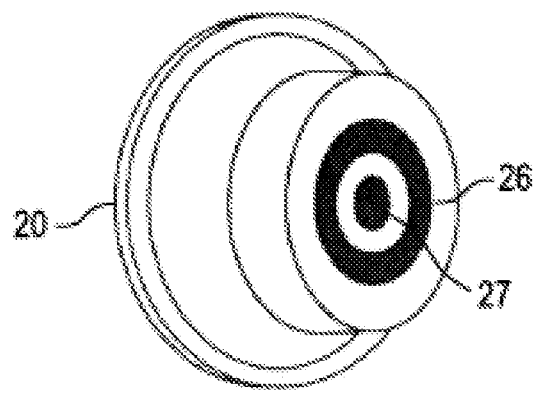
FIG. 5 shows in an oblique view a possible constructive embodiment of one of the two contact parts of the door monitoring apparatus in accordance with the second exemplary embodiment.

FIG. 5 illustrates in an oblique view a possible constructive embodiment of one of the two contact parts 19, 20, in this case by way of example of the non-movable contact part 20, as a plug-in element of a plug-in connection or coupling of the two contact parts 19, 20 that are formed in a complementary manner. The non-movable contact part 20 has an annular groove 26 and a central hole 27. The two contact surfaces 22a and 22b are provided in the region of the annular groove 26.

Figure 6:
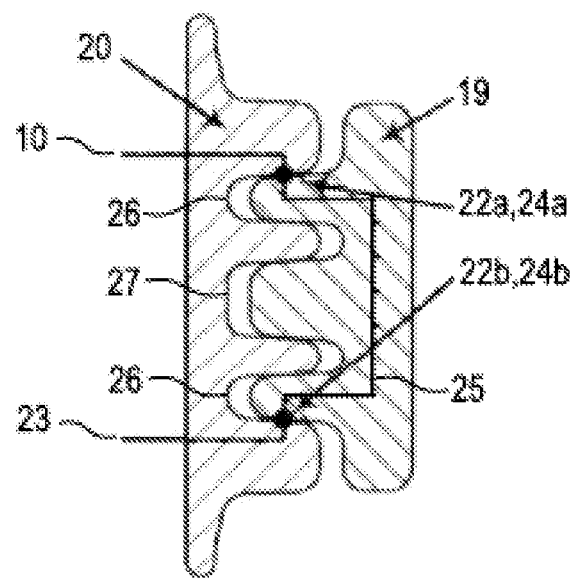
FIG. 6 shows as a sectional illustration in a side view a sketch of contact parts, which are hidden one inside the other when the door is in the closed state, with one of the contact parts in an embodiment in accordance with FIG. 5.

FIG. 6 illustrates as a sectional view in a side view a sketch of the two contact parts 19 and 20 that are hidden one inside the other when the door is in the closed state. The door contact part 19 has for this purpose a circular rib, which can be plugged into the annular groove 26, and a pin-shaped protrusion that can be plugged into the central hole 27. The contact surfaces 22a and 22b are contacted by the mating contact surfaces 24a or 24b, wherein the mating contact surfaces 24a or 24b are electrically connected to one another, as indicated by the line 25. This plug-in connection or coupling is mechanically particularly stable and renders possible a reliable contact of the contact surfaces 22a and 22b with the mating contact surfaces 24a or 24b.

Alternatively, the contact surfaces 22a, 22b can be provided as annular contact surfaces in the annular groove 26, for example in opposite-lying side walls. It is also possible for one of the contact surfaces 22a, 22b in the annular groove 26 to be present and the other of the contact surfaces 22b, 22a in the region of the hole 27. It is also possible to design the door contact part 19 as an integrally-formed metal part, with the result that it is possible to forego a dedicated line 25 or said door contact part is formed as such by the metal part. In this case, the mating contact surfaces 24a or 24b correspond to the surface region of the door contact part 19 that is brought into actual contact with the contact surfaces 22a, 22b.

In general, the shape of the contact parts 19 and 20 can also be exchanged, i.e. that the door contact part 19 has the annular groove 26 and the hole 27 and the door contact part 20 has the circular rib, which can be plugged therein, and the pin-shaped protrusion.

Also, the shape of the contact parts 19 and 20 in general is not limited to the illustrated annular groove-like shape but rather can have for example simple planar contact surfaces, pin-like contacts etc.

Moreover, the contact pairs in general can also be used so as to supply consumers (for example control elements, displays etc.), which are provided in the door, with electrical energy via the contact pairs. For example, the consumers can be connected to the electrical lines 9 or 25 and supplied with energy via the current that is flowing therein.

It goes without saying that the present invention is not limited to the illustrated exemplary embodiment.

Thus, a single-pole circuit breaker is illustrated in the exemplary embodiments. However, it is possible, by suitably connecting multiple contact parts together or by suitably designed individual contact surfaces of a non-movable contact part, fundamentally to protect any number of poles. It is thus possible to provide a two-pole circuit breaker for simple power supply appliances and a three-pole or four-pole circuit breaker for three phase appliances. This applies in particular if the contact pair(s) is/are installed directly into a current circuit for these appliance components.

In general, "a", "one" etc. can be understood to mean a singular or plurality, in particular in the sense of "at least one" or "one or multiple" etc. as long as this is not explicitly ruled out, for example by the expression "precisely one" etc.

The invention claimed is:

1. A household appliance, comprising:
a compartment;
a door for closing the compartment;
a non-movable part; and
a door monitoring apparatus including a contact pair comprising two contact parts, with a first contact part of the two contact parts being arranged on the door and a second contact part of the two contact parts being arranged on the non-movable part of the household appliance, wherein the two contact parts of the contact pair contact one another when the door is in a closed state and form a pair of plug-in contacts, and wherein at least one of the first contact part of the two contact parts or the second contact part of the two contact parts, or a combination thereof, includes an annular groove.

2. The household appliance of claim 1, wherein the door monitoring apparatus includes precisely one of said contact pair.

3. The household appliance of claim 1, wherein the two contact parts of the contact pair are each connected to an electrical line, with the electrical line of the first contact part of the two contact parts being routed through the door.

4. The household appliance of claim 1, wherein at least the second contact part of the two contact parts includes multiple contact surfaces which are electrically separated from one another, and electrical lines which are connected to the multiple contact surfaces.

5. The household appliance of claim 1, wherein the door monitoring apparatus includes two of said contact pair, with the door-arranged ones of the contact parts of the contact pairs being electrically connected to one another.

6. The household appliance of claim 1, wherein the non-movable part is a door flange.

7. The household appliance of claim 1, wherein at least one of the two contact parts is configured to have a predetermined fracture point.

8. The household appliance of claim 1, wherein the door monitoring apparatus includes an evaluation circuit, which is electrically connected to at least one of the two contact parts, so as to monitor an open state of the contact pair.

9. The household appliance of claim 1, constructed in a form of a PEF (Pulsed Electric Field) household appliance.

10. The household appliance of claim 1, wherein one of the first contact part and the second contact part comprises the annular groove, and wherein the other of the first contact part and the second contact part comprises a circular rib configured to be plugged into the annular groove when the door is in the closed state.

11. The household appliance of claim 10, wherein the first contact part comprises the circular rib and the second contact part comprises the annular groove.

12. The household appliance of claim 10, wherein the one of the first contact part and the second contact part includes one or more contact mating surfaces arranged on one or more side walls of the circular rib, wherein the other of the first contact part and the second contact part comprises a first contact surface and a second contact surface formed in a complementary manner with respect to the one or more contact mating surfaces of the one of the first contact part and the second contact part, and wherein the first contact surface and the second contact surface of the other of the first contact part and the second contact part are arranged on one or more side walls in the annular groove.

13. The household appliance of claim 12, wherein the first contact surface and the second contact surface of the other of the first contact part and the second contact part comprise annular contact surfaces arranged on opposite side walls in the annular groove.

14. The household appliance of claim 1, wherein the at least one of the first contact part or the second contact part, or the combination thereof, further comprises a central hole.

15. The household appliance of claim 14, wherein one of the first contact part and the second contact part comprises the central hole, and wherein the other of the first contact part and the second contact part comprises a pin-shaped protrusion configured to be plugged into the central hole when the door is in the closed state.

16. The household appliance of claim 15, wherein the first contact part comprises the pin-shaped protrusion and the second contact part comprises the central hole.

17. The household appliance of claim 15, wherein the one of the first contact part and the second contact part includes a first contact mating surface and a second contact mating surface, wherein the other of the first contact part and the second contact part comprises a first contact surface and a second contact surface formed in a complementary manner with respect to the first contact mating surface and the second contact mating surface of the one of the first contact part and the second contact part, wherein the first contact mating surface of the one of the first contact part and the second contact part is arranged on a side wall of the circular rib and the second contact mating surface of the one of the first contact part and the second contact part is arranged on a side wall of the pin-shaped protrusion, and wherein the first contact surface of the other of the first contact part and the second contact part is arranged on a side wall in the annular groove and the second contact surface of the other of the first contact part and the second contact part is arranged on a side wall of the central hole.

18. The household appliance of claim 14, wherein one of the first contact part and the second contact part includes one or more contact mating surfaces, wherein the other of the first contact part and the second contact part comprises a first contact surface and a second contact surface formed in a complementary manner with respect to the one or more contact mating surfaces of the one of the first contact part and the second contact part, and wherein the first contact surface of the other of the first contact part and the second contact part is arranged on a side wall in the annular groove and the second contact surface of the other of the first contact part and the second contact part is arranged on a side wall of the central hole.

19. The household appliance of claim 1, wherein one of the first contact part and the second contact part comprises the annular groove and further comprises a central hole, wherein the other of the first contact part and the second contact part comprises:
a circular rib configured to be plugged into the annular groove when the door is in the closed state, and
a pin-shaped protrusion configured to be plugged into the central hole when the door is in the closed state.

20. The household appliance of claim 19, wherein the first contact part comprises the circular rib and the pin-shaped protrusion, and wherein the second contact part comprises the annular groove and the central hole.

* * * * *